United States Patent [19]

Neugebauer

[11] Patent Number: 5,115,044

[45] Date of Patent: May 19, 1992

[54] HIGH IMPACT STRENGTH THERMOPLASTIC MOLDING COMPOSITIONS BASED ON POLYPHENYLENE ETHER GRAFT COPOLYMERS AND POLYAMIDES AND PROCESS FOR PRODUCING THEM

[75] Inventor: Wolfgang Neugebauer, Duelmen, Fed. Rep. of Germany

[73] Assignee: Huels Aktiengesellschaft, Marl, Fed. Rep. of Germany

[21] Appl. No.: 393,367

[22] Filed: Aug. 14, 1989

[30] Foreign Application Priority Data

Sep. 15, 1988 [DE] Fed. Rep. of Germany ....... 3831348

[51] Int. Cl.$^5$ .................... C08F 283/08; C08L 51/04; C08L 53/02
[52] U.S. Cl. ..................................... 525/392; 525/68; 525/92; 525/397
[58] Field of Search ................. 525/68, 391, 392, 397, 525/905

[56] References Cited

U.S. PATENT DOCUMENTS 4,097,556 6/1978 Toyama et al. ...................... 525/68

Primary Examiner—Jacob Ziegler
Attorney, Agent, or Firm—Oblon, Spivak, McClelland, Maier & Neustadt

[57] ABSTRACT

High impact strength thermoplastic molding compositions based on polyphenylene ether graft copolymers and polyamides and process for producing them. The compositions are distinguished by high toughness, very good phase adhesion, high solvent resistance, and high dimensional heat stability. The molding compositions contain 70 to 250 parts of a polyamide and 100 parts of a graft copolymer that is prepared by the reaction of 100 parts of a polyphenylene ether with 0.1 to 6 parts of a mixture of 10 to 50 mole-% maleic anhydride and 90 to 50 mole-% of a vinylaromatic compound. The molding compositions are used for the production of industrial items such as pipes, panels, or cases, for example.

13 Claims, 1 Drawing Sheet

HIGH IMPACT STRENGTH THERMOPLASTIC MOLDING COMPOSITIONS BASED ON POLYPHENYLENE ETHER GRAFT COPOLYMERS AND POLYAMIDES AND PROCESS FOR PRODUCING THEM

BACKGROUND OF THE INVENTION

1. Field of the Invention

Polyphenylene ethers (PPE) are high-performance engineering thermoplastics with high melt viscosities and high softening points. They are used especially where stability at high temperatures is needed (see U.S. Pat. Nos. 3,306,874, 3,306,875, 3,257,357, and 3,257,358). Shaped parts made of pure polyphenylene ethers are brittle because of their poor impact strength, and their solvent resistance is unsatisfactory. Therefore, mixtures of polyphenylene ethers with other thermoplastics are generally used.

Blends of polyphenylene ethers with polyamides show good solvent resistance and good flowability (DE-OS 16 94 290 and JP-OS 78/47,390). Usually, however, brittle products are obtained since the two components are incompatible.

It has, therefore, been suggested that the compatibility of the two polymers be increased by adding a sufficient quantity of a flow agent, for example an organic phosphate (EP-OS 0 129 825) or a diamide (EP-OS 0 115 218). However, the improved compatibility is accompanied by substantially reduced dimensional heat stability. Molding compositions to which have been added copolymers of styrene and unsaturated acid derivatives have the same drawback (EP-OS 0 046 040).

The object of European Pat. No. 0 024 120 is resin compositions that consist of a polyphenylene ether, a polyamide, a third component, and optionally high molecular weight rubbers. A liquid diene polymer, an epoxide, or a compound with a double or triple bond and a functional group (for example, an acid, anhydride, ester, amino, or alcohol group) is used as the third component. However, the toughness of the resin compositions obtained is inadequate for many applications.

Better compatibility of the two phases is achieved by functionalizing the polyphenylene ether, for example with maleic anhydride in the presence of sources of free radicals (JP-OS 84/066,452). Of course, this advantage is obtained at the expense of partial crosslinking of the PPE phase. In WO 87/00 540, the functionalizing of polyphenylene ethers with maleic anhydride without sources of free radicals is sufficiently successful only in the presence of special triblock copolymers, while in U.S. Pat. No. 4,654,405, the reaction of powdered polyphenylene ether with maleic anhydride, likewise in the absence of radical sources, and further blending with polyamides, is described. However, the degree of functionalizing in this case is still inadequate.

The functionalizing of polyphenylene ethers by reaction of the polymers with hydroxypolycarboxylic acids or their derivatives in the melt is described in EP-OS 0 185 054. After blending with polyamides, molding compositions are obtained whose crack growth and notched impact test results reveal unsatisfactory bonding at the phase interfaces.

The object of EP-OS 0 195 815 is the functionalizing of polyphenylene ethers with trimellitic anhydride acid chloride in solution. Blends with polyamides do tend to be better than in the prior case, but because of the described functionalizing, either hydrogen chloride escapes, or considerable amounts of ammonium chlorides are formed when a tertiary amine is added, and corrosion problems therefore arise. The economically interesting direct isolation of the polyphenylene ether by removing the solvent cannot be used in this case.

A combination of polyphenylene ethers and polyamides is described in EP-OS 0 211 201, that is made by capping the terminal OH groups of the polyphenylene ether, followed by polymerization of a lactam. The capping agent in this case acts as a promoter for the lactam polymerization. Examples of suitable promoters are maleic anhydride, cyanuric chloride, N,N'-carbonyldiimidazole, and phenyl chloroformate. However, these compositions are unsatisfactory in practice. The functional groups of the promoters are chemically unstable, and the limitation to polyamides that are obtained by polymerization of lactams is limiting.

DE-OS 36 00 366 describes thermoplastic molding compositions that contain as essential components a polyphenylene ether, a comb polymer with a hydrocarbon as the main chain and polyphenylene ethers as sidechains, a functionalized polyethylene, and a polyamide. The compositions are therefore true complex mixtures in which each of the four components is necessary to provide both good compatibility and high impact strength and dimensional heat resistance. It would be desirable if these objectives could also be reached in a simpler way.

DE-OS 36 15 393 and OS 36 21 805 describe molding compositions that contain a remelted preformed composition in addition to a polyamide. The preformed composition consists of a polyphenylene ether, a polyoctenylene, and at least one acid component such as maleic anhydride. In both cases, it is necessary to melt the polyphenylene ether with a chemically aggressive acid component and to add an impact strength promoter to reach a qualitatively satisfactory level of notched impact strength. A similar process is described in EP-OS 0 232 363.

The process described in JP-OS 84/86,653 provides for grafting 100 parts of polyphenylene ether by a radical process with 10 to 300 parts of a mixture of 50 to 99% styrene and 50 t 1% unsaturated carboxylic acids or anhydrides and blending the product with polyamides. The molded parts formed have good mechanical properties, but the dimensional heat stability is impaired by the considerable proportion of styrene. When it is attempted to compensate for this drawback by increasing the proportion of anhydride, molding compositions with severely impaired properties are obtained, for example inadequate impact strength and notched impact strength.

European Pat. No. 0 147 874 tries not to detract from the dimensional heat resistance by adding small amounts (0.1–1.9 wt.%) of a styrene-maleic anhydride copolymer (41 to 50 mole-% maleic anhydride) to a mixture of polyphenylene ethers and polyamides. However, the examples show that no improvement of the completely inadequate mechanical characteristics is obtained by this addition, probably because of the inadequate interaction with the polyphenylene ether.

The molding compositions known from the state of the art, therefore, can either be produced only at high cost, or the molded parts produced from them have unsatisfactory properties. It is the purpose of this invention to avoid these drawbacks.

SUMMARY OF THE INVENTION

In the present invention, molding compositions based on polyphenylene ethers and polyamides can be produced that are distinguished by high toughness, very good phase adhesion (manifested by high crack growth test figures), high solvent resistance, and high dimensional heat resistance. They contain (i) 100 parts by weight of a graft copolymer that can be obtained by reacting 100 parts by weight of a polyphenylene ether with about 0.1 to 6 parts by weight of a mixture of 10 to 50 mole-% maleic anhydride and 90 to 50 mole % of a vinylaromatic compound;
(ii) 70 to 250 parts by weight of a polyamide;
(iii) 0 to 200 parts by weight of an optionally functionalized impact strength modifier or promoter, and
(iv) optionally other additives such as flameproofing agents, pigments, oligomers and polymers, antistatic agents, stabilizers, processing aids, or reinforcing agents.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
FIG. 1 is a scanning electron micrograph of the low-temperature fracture surface for Comparison Example C.

Polyphenylene ethers grafted with styrene-maleic anhydride copolymers are known from JP-OS 74/2343 and 74/20,379. Copolymers are described in JP-OS 74/2343 that contain a styrene-maleic anhydride copolymer as the principal chain, onto which is grafted a preferably relatively low molecular weight polyphenylene ether (degree of polymerization 10–200, preferably 10–100) as a sidechain by esterification of the terminal phenolic hydroxyl group. The copolymers thus contain 15 to 90 parts by weight of styrene and 1 to 10 parts by weight of maleic anhydride for 100 parts of polyphenylene ether. Blends of such copolymers and vinyl copolymers are described in JP-OS 74/20,379. Use of these copolymers for blends with polyamides is not mentioned in either of the two disclosures. The graft copolymers of polyphenylene ethers, styrene, and maleic anhydride that are used in the present invention differ from those described in JP-OS 74/2343 and 74/20,379 particularly in the following points:

(a) the present graft copolymers consist of a polyphenylene ether main chain and short sidechains of styrene-maleic anhydride copolymers;
(b) the present copolymers lie outside of the composition of the Japanese references; in particular, they contain less styrene, and
(c) the styrene-anhydride copolymer is not bonded to the phenolic end group of the polyphenylene ether to form a relatively labile half-ester, but rather is grafted to the methyl groups of the polyphenylene ether, by which a compound stable even in the melt is formed.

Grafting a mixture of styrene and maleic anhydride to polymeric substrates that have active or labile hydrogen atoms without radical initiators at temperatures above approximately 120° C. is basically known (DE-OS 21 08 749 and U.S. Pat. No. 3,708,555), but it was not expected that polyphenylene ethers would be so suitable for this graft reaction. Suitable polyphenylene ethers are polymers that are constructed of the units II

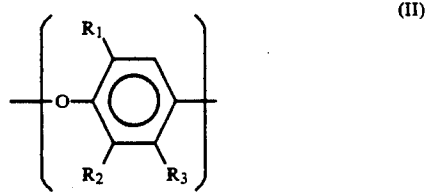

(II)

in which $R_1$, $R_2$, and $R_3$, independently of one another, stand for hydrogen, alkyl or aryl groups with up to 10 carbon atoms, or benzyl groups, with the limitation that $R_1$ may be hydrogen only when $R_2$ is a tertiary alkyl group, particularly a tertiary butyl group.

It is preferred to use polyphenylene ethers that consist of 80 to 100% units of Formula I

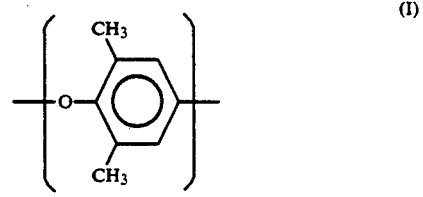

(I)

and consist of 20 to 0% units of Formula II. In this case, the s where $R_1=R_2=CH_3$ and $R_3=H$ is excluded.

The polyphenylene ethers can be prepared from the phenols, for example in the presence of complexing agents such as cupric bromide and morpholine (DE-OS 32 24 692 and 32 24 691). The viscosity numbers determined by the method of DIN 53 728 in chloroform at 25° C. are in the range of 20 to 80 $cm^3/g$.

A substituted styrene with up to 20 carbon atoms, such as alpha-methylstyrene, p-methylstyrene, p-t-butylstyrene, or indene can be used as the vinylaromatic compound, but unsubstituted styrene is preferred because of its ready availability.

Suitable polyamides are aliphatic homopolyamides and copolyamides that contain at least 50% aliphatic monomer units and preferably have exclusively aliphatic structure. In particular, the 6-, 46-, 66-, 612-, 11-, 12-, 1010-, and 1012-polyamides might be mentioned here. The identification of the polyamides conforms to international standard, with the first number(s) indicating the number of carbon atoms of the amine starting material and the last number(s) indicating the number of carbon atoms in the dicarboxylic acid. When only one number is given, this means that the starting material was an aminocarboxylic acid or its lactam (H. Domininghaus "Die Kunststoffe und ihre Eigenschaften", VDI Verlag, 1976, page 272). However, mixed aliphaticaromatic copolyamides are also suitable (see U.S. Pat. Nos. 2,071,250; 2,071,251; 2,130,523; 2,130,948; 2,241,322; 2,312,966; 2,512,606; 3,393,210; and Kirk-Othmer, Encyclopedia of Chemical Technology, Vol. 18, John Wiley & Sons (1982), pages 328 and 435). The number average molecular weight of the polyamides is preferably between 10,000 and 50,000.

It may be desirable for demanding applications to add an impact strength modifier or promoter. For example, this impact strength promoter can be a rubber or a partially crystalline thermoplastic. Suitable representatives, for example, are ethylene-propylene copolymers, ethylene-propylene-diene terpolymers, i.e., EP(D)M rubbers, polypentenylene, polyoctenylene, polyethylene, or mixtures of these. The impact strength modifiers can be functionalized pursuant to the state of the art, for example with maleic anhydride, optionally in the presence of styrene. Preferred impact strength modifiers are polyoctenylene or ethylene-propylene copolymers and ethylene-propylene-diene terpolymers.

The molding compositions can also contain unmodified or impact strength-modified polystyrene resins. Only small amounts of these resins are generally used to produce high dimensional heat resistance.

The polyphenylene ether can be grafted with the mixture of maleic anhydride and styrene at temperatures between 100° and 350° or 100 and 310° C. in solution, in the solid phase, or in the melt. If desired, radical initiators such as t-butylperbenzoate, di-t-butyl peroxide, or cumyl hydroperoxide can also be added. Preferred embodiments are:

a) A solution of 100 parts of polyphenylene ether in 50 to 1000 parts of an inert solvent such as toluene, xylene, ethylbenzene, or chlorobenzene is treated with the necessary amounts of maleic anhydride and styrene, and the temperature is raised. Pressure can be applied if desired. The product is isolated by precipitation or evaporation of the solvent, for example in a degassing extruder.

b) A polyphenylene ether granulate is treated with a liquid mixture of maleic anhydride and styrene at temperatures below 80° C. After the mixture has diffused in, the grafting is carried out at temperatures above 100° C. , either in the solid phase or in the melt, using a single-screw or double-screw extruder.

Grafting the polyphenylene ether with the mixture of maleic anhydride and styrene results in a chemical reaction yielding bonded succinic acid anhydride groups in the grafted polyphenylene ether copolymer. The graft copolymer contains about 0.01–2.7% by weight, and preferably 0.1–1.5% by weight of grafted succinic anhydride groups. Especially preferred graft copolymers are those containing about 0.3–1.2 weight percent succinic acid anhydride groups.

If the molding composition is to contain an impact strength component, it may be beneficial to premix the component with the polyphenylene ether and to graft the mixture of styrene and maleic anhydride to this mixture.

The polyamides are combined with the polyphenylene ether graft copolymer by mixing the two melts in an efficient kneading unit at 250° to 350° C., preferably 270° to 310° C. It is beneficial to premix and extrude the two components or to meter the polyamide into the melt of the polyphenylene ether graft copolymer.

The thermoplastic compositions pursuant to the invention, in addition to a flameproofing agent, can also contain other additives such as pigments, oligomers and polymers, antistatic agents, stabilizers and processing aids, as well as reinforcing agents. The proportion of reinforcing agent can be up to 50 wt.%, that of the flameproofing agent can be up to 15 wt.%, and that of all other additives in total can be up to 5 wt.%, based on the total amount of molding composition.

Aromatic phosphorus compounds such as triphenylphosphine oxide and triphenyl phosphate are particularly suitable flameproofing agents. An ordinary flameproofing agent containing halogen can also be used. Organic compounds containing halogen such as those described, for example, in the monograph by H. Vogel "Flammfestmachen von Kunststoff", Huthig-Verlag, 1966, on pages 94 to 102, are suitable. However, halogenated polymers such as halogenated polyphenylene ethers (see DE-OS 33 34 068) or brominated oligostyrenes or polystyrenes can also be used. The compounds should contain more than 30 wt.% halogen.

When flameproofing agents containing halogen are used, it is recommended to use a synergist. Compounds of antimony, boron, and tin are suitable. These are generally used in amounts of 0.5 to 10 wt.% based on the thermoplastic compositions.

Suitable reinforcing agents are, in particular, glass fibers and carbon fibers.

Suitable stabilizers include organic phosphites, such as didecyl phenyl phosphite and trilauryl phosphite, sterically hindered phenols, and tetramethylpiperidine derivatives, benzophenone derivatives, and triazole derivatives.

Suitable processing aids are waxes such as oxidized hydrocarbons and their alkali metal and alkaline earth metal salts.

The molding compositions obtained can be processed into molded objects by the procedures customary for processing thermoplastics, such as injection molding and extrusion, for example.

Examples of industrial fields of use are pipes, panels, cases, and other industrial items for the automobile, electricity, and precision mechanism sectors.

The molding compositions pursuant to the invention in comparison with conventional products are distinguished by high toughness and good dimensional heat stability.

In the following examples, the viscosity number (J) of the polyphenylene ether was measured in cm$^3$/g by the method of DIN 53 728 at 25° C. in chloroform (concentration 5 g/l).

The relative viscosity Eta$_{rel}$ of the polyamide was determined in m-cresol (concentration 5 g/l) with a Ubbelohde viscometer at 25° C.

The elongation at break (Epsilon ®) was determined by the method of DIN 53 455 on dumbbell-shaped test pieces injection molded at 290° C.

Small standard test pieces injection molded at 2B0° C. were used for the measurement of notched impact strength by the method of DIN 53 453.

Other features of the invention will become apparent in the course of the following descriptions of exemplary embodiments which are given for illustration of the invention and are not intended to be limiting thereof.

EXAMPLES

Polyphenylene ethers

The polyphenylene ethers are obtained by oxidative coupling of 2,6-dimethylphenol, terminating the reaction at the desired value of J, and "reaction-extraction" by the method of DE-OS 33 13 864 and OS 33 32 377.

Example 1.1

A polyphenylene ether with a value of $J=55$ cm$^3$/g was prepared by the general method noted above. The solvent was removed by evaporation, and the melt was extruded through a degassing extruder at 310° C. The product was then granulated and dried.

Preparation of the polyphenylene ether graft copolymer

A liquid mixture (temperature 55° C.) of 20 g of maleic anhydride and 24 g of styrene was added in portions to 2.0 kg of polyphenylene ether from Example 1.1 in a laboratory mixer at a slow rate such that the granulate did not stick together.

The granulate thus treated was remelted in a Leistritz LSM 30.34 double-screw extruder at 290° C., and was pelletized from the strand and dried. A portion of the product was dissolved in toluene, precipitated with acetone, and reprecipitated two more times using the same solvent. Titration showed 0.73 wt.% of grafted succinic anhydride groups.

Molding compositions with no impact strength component

ULTRAMID® A4, a product of BASF AG, D-6700 Ludwigshafen, was used as polyamide 66.

VESTAMID® L 1901, a product of HUELS AKTIENGESELLSCHAFT, D-4370 Marl, was used as polyamide 12.

ULTRAMID® B4, a product of BASF AG, D-6700 Ludwigshafen, was used as polyamide 6.

Comparison Example C (method of EP-OS 0 147 874)

2.0 kg of polyphenylene ether from Example 1.1, 2.0 kg of polyamide 66, and 40 g of an alternating styrene-maleic anhydride copolymer, prepared from 50.0 g (510 mmoles) of maleic anhydride and 53.5 g (514 mmoles) of styrene with 0.5 ml of t-butyl perbenzoate in 400 ml of chlorobenzene at 90° to 115° C.; Eta$_{red}$=1.41 dl/g, were mixed in a double-screw extruder at a melt temperature of 290° C. The product was then granulated and dried.

Examples 3.1 to 3.3

The polyphenylene ether graft copolymers prepared by the method of Example 2 were mixed with polyamides as indicated in Table 1, and remelted in a double-screw extruder at 290° C., pelletized from the strand, and dried. The products were injection molded into standard forms and tested.

Comparison Examples D to F (method of JP-OS 84/86,653)

40 parts of polyphenylene ether from Example 1.1 was dissolved in 80 parts of toluene, treated with the amounts of maleic anhydride and styrene shown in Table 1 and 0.48 (Example D) or 0.64 parts of di-t-butyl peroxide (Examples E and F), and boiled under reflux for 15 hours. The solutions were then poured onto dryer trays, evaporated under vacuum, and then dried to constant weight at 120° C. The graft copolymers obtained were blended in a 40:60 ratio with polyamide 6 (ULTRAMID® B4) on a double-screw extruder.

TABLE 1

Composition (parts by weight) and properties of molding compositions without impact strength components

| Example | Polyphenylene ether | maleic anhydride | Styrene | Polyamide[a] Type | Polyamide[a] Parts | $a_K$[b] (kJ/m$^3$) | $E_R$* (%) | Vicat temperature B/50 (°C.) |
|---|---|---|---|---|---|---|---|---|
| A   | 40 | 0.40 | —    | PA 12 | 60   | 1 | 2  | 160 |
| B   | 40 | 0.40 | —    | PA 12 | 60   | 3 | 38 | 162 |
| 3.1 | 40 | 0.40 | 0.48 | PA 12 | 61.3 | 9 | 66 | 164 |
| C   | 50 | c)   | c)   | PA 66 | 50   | 1 | 2  | 209 |
| 3.2 | 50 | 0.50 | 0.60 | PA 66 | 50   | 3 | 22 | 209 |
| 3.3 | 40 | 0.40 | 0.48 | PA 6  | 61.3 | 9 | 33 | 196 |
| D   | 40 | 2.33 | 2.48 | PA 6  | 67.2 | 5 | 16 | 191 |
| E   | 40 | 4.66 | 4.96 | PA 6  | 74.4 | 4 | 2  | 187 |
| F   | 40 | 0.40 | 9.22 | PA 6  | 74.4 | 7 | 30 | 181 |

[a]PA 12 = VESTAMID® L 1901 (HUELS AKTIENGESELLSCHAFT)
PA 66 = ULTRAMID® A4 (BASF AKTIENGESELLSCHAFT)
PA 6 = ULTRAMID® B4 (BASF AKTIENGESELLSCHAFT)
[b]Notched impact strength at room temperature
c)1 part of a copolymer of 0.48 parts maleic anhydride and 0.52 parts styrene
*E = Epsilon

Comparison Example A (method of EP 0 024 120)

A mixture of 2.0 kg of polyphenylene ether from Example 1.1, 3.0 kg of polyamide 12, and 20 g of maleic anhydride was mixed in a Leistritz LSM 30.34 double-screw extruder at a melt temperature of 290° C. The product was then granulated and dried.

Comparison Example B (method of JP-OS 84/066,452)

20 g of maleic anhydride and 10 g of dicumyl peroxide were admixed with 2.0 kg of polyphenylene ether from Example 1.1 in a double-screw extruder at a melt temperature of 290° C. The product was then granulated and dried. 1.6 kg of the product was mixed with 2.4 kg of polyamide 12 in the melt at 290° C.

Table 1 shows that the elongation at break and notched impact strength values decrease considerably

- when a physical mixture of polyphenylene ether, maleic anhydride, and polyamide is used,
- when it is attempted to graft maleic anhydride to polyphenylene ether by a radical mechanism without comonomer
- when the copolymer of styrene and maleic anhydride is not grafted to the polyphenylene ether but is admixed physically, and
- when an amount of maleic anhydride together with styrene surpassing the range of the invention is grafted to the polyphenylene ether.

Figure 2:
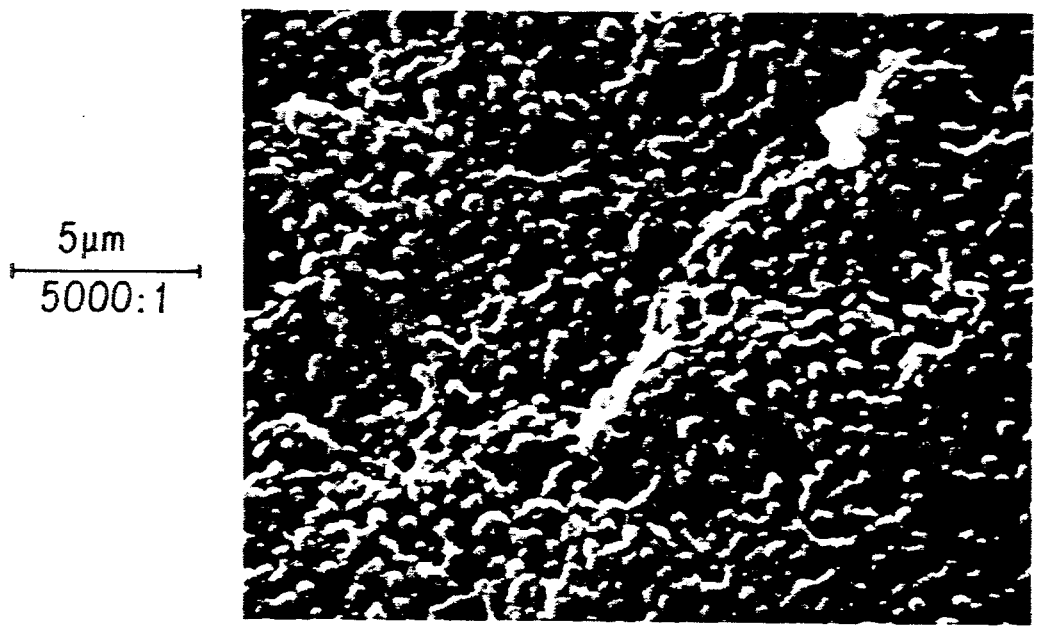
FIG. 2 is a scanning electron micrograph of the low-temperature fracture surface for Example 3.2.

To obtain blends with good properties, therefore, a specific grafting of the polyphenylene ether is absolutely necessary. The differences are seen particularly clearly in scanning electron photographs of the low-temperature fracture surfaces. The polyphenylene in Comparison Example C is dispersed in the form of long fibers approximately 1 to 3 μm thick without phase adhesion. In contrast, there are spherules of the grafted polyphenylene ether with a diameter of about 0.5 μm in Example 3.2 (see FIGS. 1 and 2). Even this comparison shows that the phase adhesion that is responsible for the mechanical properties is substantially better in the latter case.

When the proportion of styrene according to JP-OS 84/86 653 is increased beyond the amount required by the present invention, a reduced dimensional heat stability results. Comparison Example F compared with Example 3.3 shows clearly that molding compositions obtained pursuant to the prior art show lower dimensional heat stability than the present invention.

strand, and dried. The products were injection molded to standard specimens and tested.

Example 5.2

By the method of Example 5.1, 10 parts of BUNA ® AP 437 from Example 4.2 was mixed with 90 parts of polyphenylene ether and grafted. Titration showed 0.92 wt.% of grafted succinic anhydride. Molding compositions were then prepared with VESTAMID ® L 1901 by a similar method and the specimens obtained were tested.

Obviously, numerous modifications and variations of the present invention are possible in light of the above teachings. It is therefore to be understood that within the scope of the appended claims, the invention may be practiced otherwise than as specifically described herein.

TABLE 2

| | Composition (parts by weight) and properties of molding compositions with impact strength components | | | | | | | | |
|---|---|---|---|---|---|---|---|---|---|
| Example | Polyphenylene ether | Polyoctenylene | EPDM | maleic anhydride | Styrene | Polyamide 12 | $a_K{}^{a)}$ (kJ/m$^3$) | $E_R{}^*$ (%) | Vicat temperature B/50 (°C.) |
| 5.1 | 36 | 4 | — | 0.40 | 0.48 | 61.3 | 19 | 87 | 164 |
| 5.2 | 36 | — | 4 | 0.40 | 0.48 | 61.3 | 10 | 147 | 164 |

$^{a)}$Notched impact strength at room temperature
$^*E$ = Epsilon

Impact strength components

Example 4.1 Polyoctenylene

A polyoctenylene with a J value of 120 cm$^3$/g and a trans-content of 80% was used. Such a product is available on the market under the name VESTENAMER ® 8012 (manufacturer: HUELS AKTIENGESELLSCHAFT, D-4370 Marl). Other character1st1c data for this product can be found in the journal "Kautschuk, Gummi, Kunststoffe" (1981), pages 185 to 190, and in Huels pamphlet No. 2247 "VESTENAMER ® 8012". The polyoctenylene can also be made, for example, by the method of K.J. Ivin "Olefin Metathesis", Academic Press, pages 236 ff., 1983, and the other literature references indicated there.

Example 4.2 EPDM rubber

A sequential EPDM with a Mooney viscosity (ML 1+4/100° C.) of 85 was used (tertiary component: ethylidenenorbornene). Such a product is available on the market under the name BUNA ® AP 437 (manufacturer: BUNAWERKE HUELS GmbH, D-4370 Marl 1).

Molding compositions with impact strength components

Example 5.1 Mixture of polyphenylene ether and polyoctenylene or EPDM rubber 90 parts of polyphenylene ether from Example 1.1 and 10 parts of VESTENAMER ® 8012 from Example 4.1 were dissolved in 810 parts of toluene. The solution was concentrated to 70%. The remaining solvent was removed by means of a degassing extruder. It was granulated and dried. The mixture was grafted by the method of Example 2. Titration showed 0.96 wt.% of grafted succinic anhydride.

The grafted mixture was mixed with VESTAMID ® L 1901 as indicated in Table 2 and was remelted in a double-screw extruder at 290° C., pelletized from the

What is claimed as new and desired to be secured by Letters Patent of the United States is:

1. A thermoplastic molding composition, comprising:
   a) 70-250 parts by weight of a polyamide, and
   b) 100 parts by weight of a graft copolymer, said graft copolymer being prepared by a process consisting essentially of reacting 100 parts by weight of a polyphenylene ether with about 0.1-6 parts by weight of a mixture of 10-50 mole% maleic anhydride and 90-50 mole% of a vinylaromatic compound, wherein said reacting is conducted at a temperature between 100-350° C. in solution, in the solid phase, or in a melt.

2. The composition of claim 1, wherein said polyphenylene ether comprises 80 to 100% monomer units of Formula I and 20 to 0% of different monomer units of Formula II,

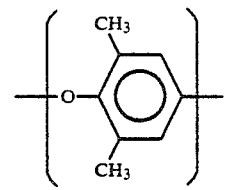

I

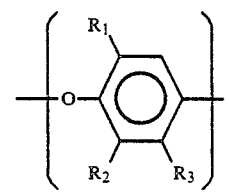

II in which R$_1$, R$_2$, and R$_3$, independently of one another, are hydrogen, alkyl or aryl groups with up to 10 carbon atoms, or benzyl groups, with the limitation that R$_1$ is hydrogen only if R$_2$ is teritary alkyl group.

3. The composition of claim 1, wherein said polyphenylene ether has a viscosity number (J) between 20 and 80 cm$^3$/g as measured at 25° C. in chloroform at a concentration of 5 g/l.

4. The composition of claim 1, wherein the number average molecular weight of said polyamide is between 10,000 and 50,000.

5. The composition of claim 1, wherein said polyamide contains at least 50% aliphatic monomer units.

6. The composition of claim 1, wherein said polyamide is selected from the group consisting of polyamides 6, 46, 66, 612, 1010, 1012, 11 and 12.

7. The composition of claim 1, wherein said vinylaromatic compound is styrene or an alkyl-substituted styrene having up to 20 carbon atoms.

8. The composition of claim 2, wherein $R_1$ is hydrogen and $R_2$ is a tertiary butyl group.

9. The composition of claim 7, wherein said vinylaromatic compound is styrene.

10. The composition of claim 1, wherein said vinylaromatic compound is selected from the group consisting of α-methylstyrene, p-methylstyrene, p-t-butylstyrene and indene.

11. The composition of claim 1, wherein said polyamide is an aliphatic homopolyamide or an aliphatic copolyamide.

12. A thermoplastic molding composition, comprising:
   a) 70-250 parts by weight of a polyamide, and
   b) 100 parts by weight of a graft copolymer, said graft copolymer being prepared by a process consisting essentially of reacting 100 parts by weight of a polyphenylene ether with about 0.1-6 parts by weight of a mixture of 10-50 mole % maleic anhydride and 90-50 mole % of a vinyl aromatic compound without radical initiators at a temperature between 100-350° C. in solution, in the solid phase or in a melt.

13. The process of claim 12, wherein said reacting step consists of reacting said polyphenylene ether with said maleic anhydride and said vinyl aromatic compound.

* * * * *